(12) United States Patent
Watanabe

(10) Patent No.: US 7,671,313 B2
(45) Date of Patent: Mar. 2, 2010

(54) IMAGE SENSOR AND CONTROL METHOD OF THE IMAGE SENSOR

(75) Inventor: Takamoto Watanabe, Nagoya (JP)

(73) Assignee: DENSO CORPORATION, Kariya (JP)

(*) Notice: Subject to any disclaimer, the term of this patent is extended or adjusted under 35 U.S.C. 154(b) by 467 days.

(21) Appl. No.: 11/393,818

(22) Filed: Mar. 31, 2006

(65) Prior Publication Data

US 2006/0243885 A1 Nov. 2, 2006

(30) Foreign Application Priority Data

Apr. 5, 2005 (JP) ............................. 2005-108824

(51) Int. Cl.
*H01L 27/00* (2006.01)
*H01J 40/14* (2006.01)
(52) U.S. Cl. ............................ 250/208.1; 250/214 DC; 341/155
(58) Field of Classification Search ............... 250/208.1, 250/214 R, 214 DC; 341/155, 157, 161, 341/163; 324/607, 617
See application file for complete search history.

(56) References Cited

U.S. PATENT DOCUMENTS

| | | | |
|---|---|---|---|
| 5,396,247 A | 3/1995 | Watanabe et al. | |
| 6,809,769 B1 | 10/2004 | Yang | |
| 6,850,178 B2 * | 2/2005 | Watanabe | 341/155 |

FOREIGN PATENT DOCUMENTS

| | | |
|---|---|---|
| EP | 1 014 683 | 6/2000 |
| JP | H05-259907 | 10/1993 |
| JP | A-10-233967 | 9/1998 |
| JP | A-2000-152085 | 5/2000 |
| JP | A-2000-184282 | 6/2000 |
| JP | 2000-299820 | 10/2000 |
| JP | 2000-349638 | 12/2000 |
| JP | 2002-044527 | 2/2002 |
| JP | A-2005-020774 | 1/2005 |

OTHER PUBLICATIONS

Office Action dated Aug. 26, 2008 in corresponding Japanese patent application No. 2005-108824 (and English translation).

* cited by examiner

*Primary Examiner*—Kevin Pyo
(74) *Attorney, Agent, or Firm*—Posz Law Group, PLC

(57) ABSTRACT

An image sensor has plural array blocks B1 to B20 arranged in a two dimensional (2D) arrangement. Each array block has a sub array and a corresponding analogue to digital (A/D) converter for performing an A/D conversion of light signals (or detection signals) output from the sub array. The sub array has plural picture element cells arranged in a 2D arrangement. Each A/D converter has a pulse delay circuit having delay units of plural stages connected in series. Each delay unit delays an input pulse by a delay time corresponding to a level of the light signals received from the sub array. A pulse delay type A/D converter is used as the A/D converter, which outputs the number of the delay units as an A/D conversion data item through which the input pulse passes for a measurement time period.

10 Claims, 10 Drawing Sheets

IMAGE SENSOR AND CONTROL METHOD OF THE IMAGE SENSOR

CROSS-REFERENCE TO RELATED APPLICATIONS

This application is related to and claims priority from Japanese Patent Application No. 2005-108824 filed on Apr. 5, 2005, the contents of which are hereby incorporated by reference.

BACKGROUND OF THE INVENTION

1. Field of the Invention

The present invention relates to an image sensor of a single IC chip and a control method of the image sensor having a light receiving element array arranged in a two dimensional (2D) arrangement and a plurality of analogue to digital (A/D) conversion circuits. The light receiving element array has at least picture element cells made of photoelectric conversion elements arranged in a 2D array, and the A/D conversion circuits perform A/D conversion of detection signals or light signals transferred from the light receiving element array.

2. Description of the Related Art

Recently, there is a strong demand to provide an image sensor capable of performing a high speed operation and to reduce the size of the image sensor in order to apply such an image sensor to various application fields such as a high performance visual sensor and image sensors. The high performance visual sensor is applicable to factory automation (FA) robots, anthropomorphic robots, and human-like robots (toy, nursing care, working, etc.). The image sensor is also applicable to a visual sensor capable of monitoring all directions, the front, rear, right, and left positions around a vehicle in improving driving safety.

In order to satisfy such a demand, there is a conventional image sensor of a single IC chip on which a light receiving element array arranged in a two dimensional (2D) arrangement and a plurality of analogue to digital (A/D) conversion circuits are formed. The light receiving element array has at least picture element cells made of photoelectric conversion elements (for example, photo diodes) arranged in a 2D array. The A/D conversion circuits perform A/D conversion of detection signals or light signals transferred from the light receiving element array. A Japanese patent laid open publication number JP2000-349638 has disclosed the conventional image sensor of a single IC chip having the configuration described above.

FIG. 10A is a diagram showing a configuration of the conventional image sensor disclosed by the Japanese patent laid open publication number JP2000-349638. FIG. 10B is a circuit diagram showing the configuration of the A/D conversion circuit 102.

As shown in FIG. 10A, the conventional image sensor 100 has a light receiving element array 101, an A/D conversion section 102, a selection section 103, a reference signal generation section 104, and a counter 105.

The light receiving element array 101 has picture elements arranged in a lattice arrangement. The A/D conversion section 102 has A/D conversion circuits 120, each of the A/D conversion circuits 120 corresponds to a group of the picture elements 110 that form each horizontal line (as a row in a lattice arrangement) of the light receiving element array 101. The selection section 103 selects the group made of the picture elements 110 that form each vertical line (as a column in a lattice arrangement) of the light receiving element array 101. The reference signal generation section 104 generates a reference signal VREF of a lamp wave, the voltage level of which increases according to the elapse of time. The counter 105 changes, namely increases or decreases its count value in synchronization of the reference signal VREF.

Each A/D conversion circuit 120 in the A/D conversion section 102 is configured to convert the detection signal (or light signals as output voltage) from the picture element cells 110 in a vertical line selected by the selection section 103.

In order to achieve downsizing, each A/D conversion sections 102 in the A/D conversion circuit 120 in the image sensor disclosed by the Japanese patent laid open publication number JP2000-349638 is made of special type A/D converter such as a successive approximation type A/D converter, a parallel type A/D converter, and a double integration type A/D converter that are different in configuration from an usual A/D converter.

In a concrete example shown in FIG. 10B, each A/D conversion circuit 120 has a comparator 121, a latch circuit 122, and a switch 123. The comparator 121 compares an analogue signal transferred from the light receiving element array 101 with the reference signal Vref generated by and supplied from the reference signal generation section 104, and generates a detection pulse that becomes a high level voltage at a timing at which the voltage of the analogue signal VSIGi (i=1, ..., and m) crosses the reference signal VREF. The latch circuit 122 latches the output from the counter 105 at the timing of the detection pulse transferred from the comparator 121. The switch 123 transfers the output signal corresponding to the detection pulse latched by the latch circuit 122 to output lines of a digital signal connected to a digital signal processing (DSP).

Various digital processing devices achieve various functions by processing information transferred from the image sensor performs in order to perform various control operations. One of the functions is a zoom-in (or zooming-up) function to enlarge a part of the images read from the image sensor.

In fact, the zoom-in function requires only the detection signals read from the light receiving elements (arranged in a 2D pattern) in the target 2D part of the 2D (two dimension) image and does not necessary other parts of the image in the zoom-in function. However, the conventional image sensor 100 having the configuration disclosed by the Japanese patent laid open publication number JP2000-349638 cannot perform the A/D conversion only for the target 2D part of the image. In other words, the conventional image sensor 100 performs the A/D conversion of the 2D image data from the entire of the image plane, not a part of the entire of the image plane. This configuration introduces the execution of the A/D conversion for unnecessary part and inefficient A/D operation because the conventional image sensor 100 must perform the A/D conversion process for the light signals obtained from the entire of the image plane that are not use in the zoom-in operation.

The A/D conversion circuit 120 in the image sensor 100 disclosed in the Japanese patent laid open publication number JP2000-349638 sweeps or scans the detection signal from the light receiving element array 101 with the lamp wave of analogue signal and outputs A/D conversion data to the DSP. In order to increase the resolution of the A/D conversion data without changing a performable voltage range for the A/D conversion, it is necessary to perform a fast counting of the counter 105 by increasing the number of bits or to decrease the slope of the lamp wave.

However, the fast counting of the counter 105 involves a limitation in operation. Further, decreasing the slope of the lamp wave requires a long processing time for the A/D conversion, and it is thereby difficult to apply the image sensor having such an A/D converter to products requiring a high speed operation.

Because the number of bits of the counter has a limitation of approximately 10 bits, it becomes difficult to apply such a conventional image sensor to products requiring a high resolution.

SUMMARY OF THE INVENTION

It is an object of the present invention to provide a new and improved image sensor of a small size formed in a single IC chip, on which a light receiving element array and an A/D conversion circuit are formed. The image sensor of the present invention is capable of executing a high speed processing such as zoom-in (zoom-up) function with high accuracy and a high resolution.

To achieve the above purposes, according to one aspect of the present invention, there is provided an image sensor mounted on a single IC chip having a light receiving element array and an analogue to digital (A/D) conversion section. In the light receiving element array, a plurality of picture element cells are arranged in a two-dimension arrangement and divided into a plurality of sub arrays. Each picture element cell has at least a photoelectric conversion element. The A/D conversion section is configured to perform A/D conversion of light signals or detection signals received from the light receiving element array. The A/D conversion section has a plurality of A/D converters. Each of the A/D converters is placed corresponding to each sub array.

According to another aspect of the present invention, an image sensor mounted on a single IC chip has a light receiving element array and an analogue to digital (A/D) conversion section. In the light receiving element array, a plurality of picture element cells are arranged in a two-dimensional arrangement and each picture element cell has at least a photoelectric conversion element. The AID conversion section is configured to perform A/D conversion of light signals received from the light receiving element array. The A/D conversion section has a plurality of A/D converters, and each of the A/D converters has a pulse delay circuit and a coding circuit. The pulse delay circuit has a plurality of delay units connected in series as plural stages configured to delay a pulse signal by a delay time corresponding to the level of the light signal received from the corresponding sub array. The coding circuit is configured to detect the number of the stages of the delay units through which the pulse signal passes during a measuring time period that is a period of a sampling clock signal (CKS) set in advance and to output A/D conversion data as numerical data corresponding to the number of the stages detected.

According to yet another aspect of the present invention, an image sensor control method controls operation of an image sensor. The image sensor has a light receiving element array and an A/D conversion section. The light receiving element array has "m" sub arrays, where m=n×k, m>n, and m, n, and k are positive integers. Each sub array has picture element cells of a same number. Each picture element cell has a photoelectric conversion element. The A/D conversion section has a plurality of A/D converters. Each A/D converter is provided for each sub array. The image sensor control method includes a step of performing an A/D conversion using only the sub arrays selected for a measurement time period that being given in advance, wherein on the A/D conversion using only the sub arrays selected, the A/D conversion is executed k-times for each of the picture element cells forming the sub arrays selected, and one of a summation value of and an average value of A/D conversion data items obtained from the k-times execution of the A/D conversions is used as the A/D conversion data to be output.

According to yet another aspect of the present invention, an image sensor control method controls operation of an image sensor. The image sensor has a light receiving element array and an A/D conversion section. The light receiving element array has "m" sub arrays, where m is a positive integer. Each sub array has picture element cells of a same number. Each picture element cell has a photoelectric conversion element. The A/D conversion section has a plurality of A/D converters. Each A/D converter is provided for each sub array. The image sensor control method includes a step of performing an A/D conversion using only the sub arrays selected for a measurement time period by which a resolution of A/D conversion data output from the A/D conversion section is changed. In the image sensor control method, the A/D conversion is performed using only the sub arrays selected for the measurement time period of "m/m" multiple times so as to output the A/D conversion data.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
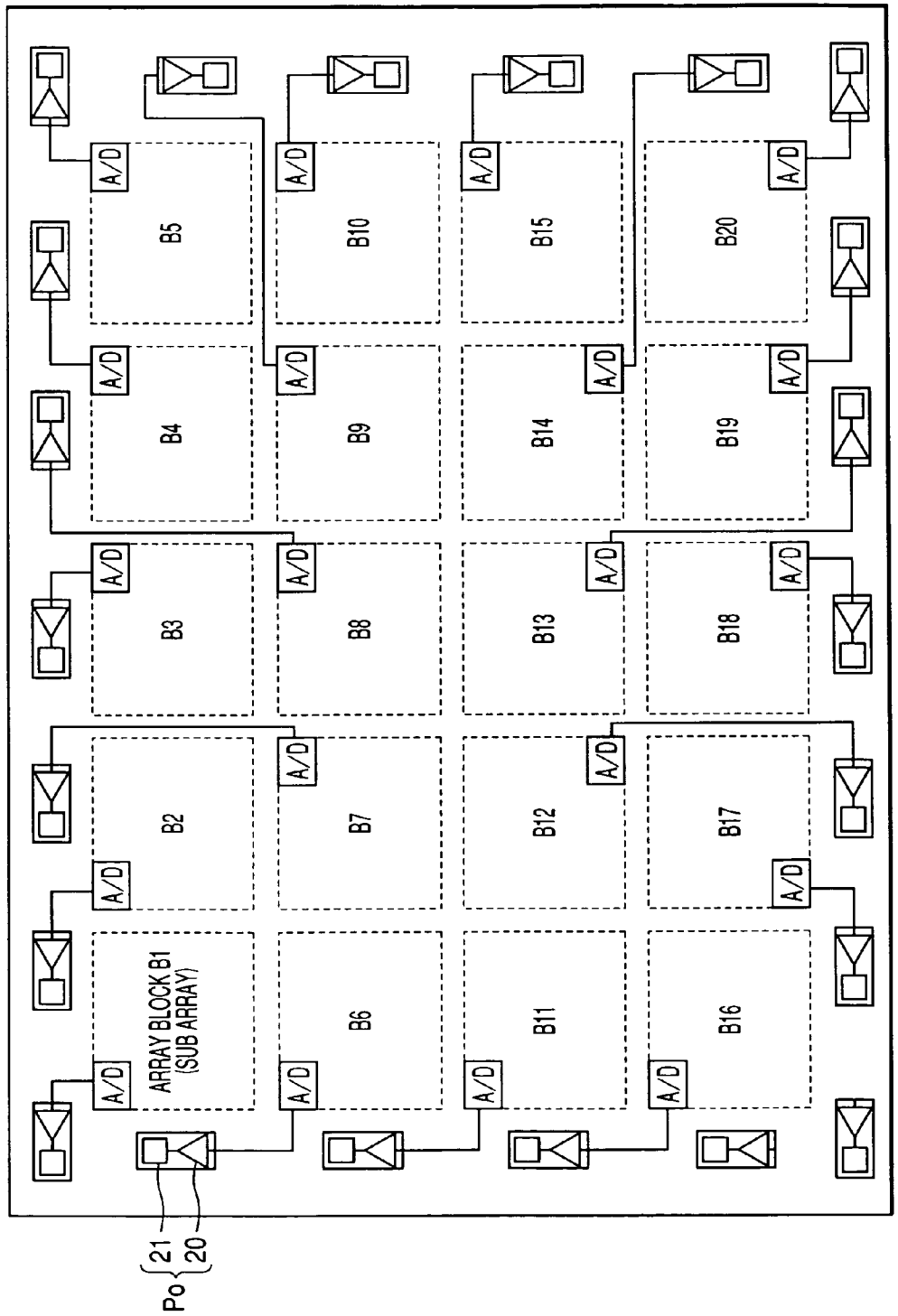
FIG. 1 is a block diagram showing a configuration of an image sensor, in particular, showing an arrangement of plural array blocks and peripheral units in the image sensor according to a first embodiment of the present invention.

Hereinafter, various embodiments of the present invention will be described with reference to the accompanying drawings. In the following description of the various embodiments, like reference characters or numerals designate like or equivalent component parts throughout the several views.

First Embodiment

FIG. 1 is a block diagram showing a configuration of an image sensor 1 according to the first embodiment of the present invention. In particular, FIG. 1 shows an arrangement of plural array blocks Bi (i=1 to 20 in the embodiment) arranged in matrix form and peripheral units in the image sensor 1 of the first embodiment. The peripheral units are output pads Po and plural pads (not shown). Each array block Bi has the corresponding output pad Po. Through the plural pads (not shown), signals of various types excepting the output signals transferred through the output pads Po are input and output. The output signal from each array block Bi (i=1 to 20) is transferred through the corresponding output pad Po. As shown in FIG. 1, those output pads Po and the other plural pads are formed at the peripheral area of the array block, that is, formed at the peripheral section of the IC chip. Although FIG. 1 shows only one transfer line through which the output pad Po and each array block Bi are connected for brevity, it is acceptable to form a plural transfer signal lines, on the basis of various functional demands, between the array block Bi and the corresponding output pad Po.

The output pad Po has an amplifier 20 and an electrode 21. The amplifier 20 amplifies the signal transferred from the array block Bi. The electrode 21 is connected to the output end of the amplifier 20. The plural pads (not shown) described above are pads for an original clock signal CK0, a selection signal SEL, a setting period information TSI and the like.

Figure 2A:
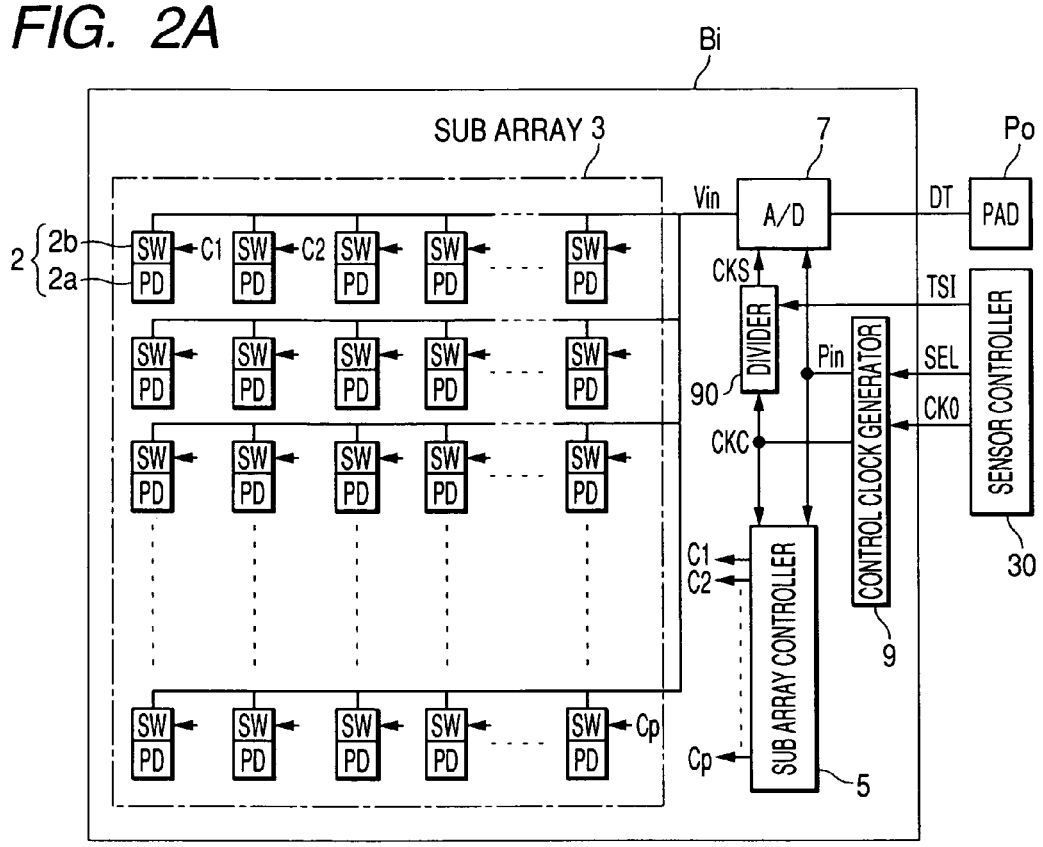
FIG. 2A is a block diagram showing a configuration of each array block in the image sensor of the first embodiment shown in FIG. 1.

FIG. 2A is a block diagram showing a configuration of each array block Bi (i=1 to 20) in the image sensor 1 of the first embodiment shown in FIG. 1.

As shown in FIG. 2A, the array block Bi (i=1 to 20) has a sub array 3, a sub array controller 5, an A/D converter 7, a control clock generator 9, and a divider 90. The sub array 3 has a plurality of element cells 2 arranges in a lattice form and as act an MOS type image sensor. In the sub array 3, each picture element 2 has a photoelectric conversion element 2a and a contactless switch 2b through which a detection signal or light signals output from the photoelectric conversion element 2a such as a photo diode is read out. The sub array controller 5 generates control signals C1 to Cp for selecting one of the contactless switches 2b in the sub array 3 sequentially. The A/D converter 7 receives the detection signal Vin from the picture element cell 2 selected by ON state of the contactless switch 2b on the basis of the control signals C1 to Cp supplied from the sub array controller 5, performs analog to digital (A/D) conversion for the detection signal Vin, and outputs digital data DT as the result of the A/D conversion to the output pad Po corresponding to the selected array block Bi. The divider 90 generates a sampling clock signal CKS and outputs it to the A/D converter 7. The control clock generator 9 generates a control clock signal CKC and an input pulse Pin. The sub array controller 5 and the divider 90 operate based on the control clock signal CKC. The sub array controller 5 and the A/D converter 7 operate based on the input pulse Pin and the sampling clock signal CKS.

In the following explanation, all of the sub arrays 3 involved in the array blocks Bi (i=1 to 20) will be referred to as the "light receiving element array", and all of the A/D converters 7 in the image sensor 1 will be referred to as the "A/D conversion section".

The control clock generator 9 receives an original clock signal CKO and a selection signal SEL transferred from the sensor controller 30. The divider 90 receives setting period information TSI transferred from the sensor controller 30. The control clock generator 9 operates based on the selection signal SEL and the original clock signal CKO.

The sensor control section 30 has a liquid crystal oscillator that is available easily in a market. The liquid crystal oscillator generates the original clock signal CKO and supplies it to the control clock generator 9.

The setting period information TSI indicates information regarding a division number "d" of the control clock signal CKC in order to obtain a sampling clock signal CKS of a period TS.

Figure 2B:
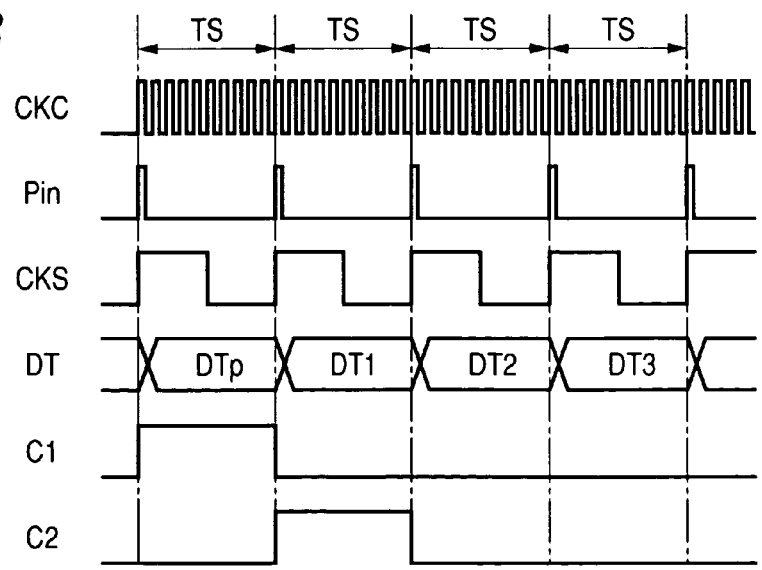
FIG. 2B is a timing chart showing operation of the array block in the image sensor of the first embodiment.

In a concrete example, when the level of the selection signal SEL indicates the permission to initiate the A/D conversion operation, the divider 90 divides the control clock signal CKC into the sampling clock signal CKS of the period TS that is set on the basis of the setting period information TSI, and the control clock signal generator 9 generates the input pulse Pin that rises at a same timing of the sampling clock signal CKS, as shown in FIG. 2B.

FIG. 2B is a timing chart showing the operation of the array block Bi in the image sensor 1 of the first embodiment.

The sub array controller 5 generates the control signals C1 to Cp that become a high level in sequential order during one period of the sampling clock signal CKS, as shown in FIG. 2B according to the control clock signal CKC and the input pulse Pin. That is, the detection signals from the picture element cells 2 in the sub array 3 are supplied in sequential order to the A/D converter 7 every the set period TS.

Figure 3:
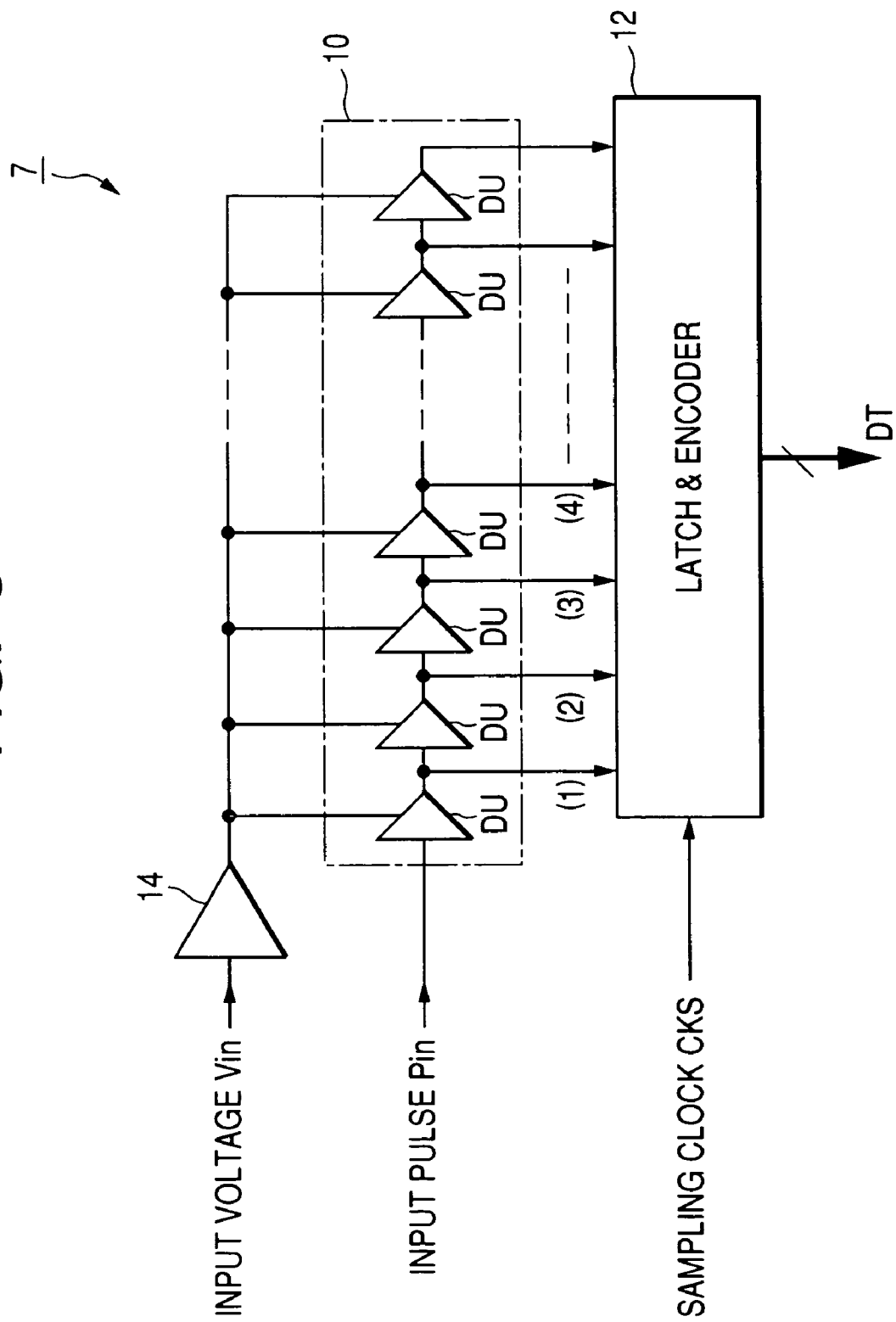
FIG. 3 is a block diagram showing a configuration of an A/D conversion circuit (also showing a part of a circuit diagram) in the array block.

FIG. 3 is a block diagram showing a configuration of the A/D converter 7 in the array block Bi.

As shown in FIG. 3, the A/D converter 7 has a pulse delay circuit 10 and a latch and encoder 12. The pulse delay circuit 10 is composed of a plurality of delay units DU connected in series forming plural stages. Each delay unit DU outputs the input pulse Pin at a given delay timing. The latch and encoder 12 latches the voltage level of the input pulse Pin from each delay unit DU at a rising edge of the sampling clock signal CKS, converts the latched detection signal to a digital data DT of a predetermined number of bits that also indicates the number of the stages of the delay unit DU counted from the front stage, and outputs the digital data DT. In particular, the reference characters (1), (2), (3), (4), . . . shown in FIG. 3 indicate the number of stage of each delay unit DU, respectively.

Each delay unit DU forming the pulse delay circuit 10 is made of gate circuits such as inverters. The input voltage Vin, namely the detection signal or the light signal Vin received from the picture elements 2 is supplied, as a target voltage of the A/D conversion, to each delay unit DU through a buffer 14.

Accordingly, the length of a delay time in each delay unit DU becomes a time corresponding to the level of the input voltage Vin (detection signal). Further, the number of the delay units DU, through which the input pulse Pin passes during one period of the sampling clock signal CKS, namely during the sampling time period TS (as the set period), is proportional to the level of the input voltage Vin (namely, the level of the detection signal).

It is so set that the sampling time period TS is longer adequately than the delay time of the delay unit DU (for example, more than several ten times of the delay time of the delay unit DU). The number of the stages of the delay units DU in the pulse delay circuit 10 is set to not less than several ten to several hundred stages in order to avoid a case that the input pulse Pin has already passes through the pulse delay circuit 10 at the elapse of the set period TS.

Figure 4A:
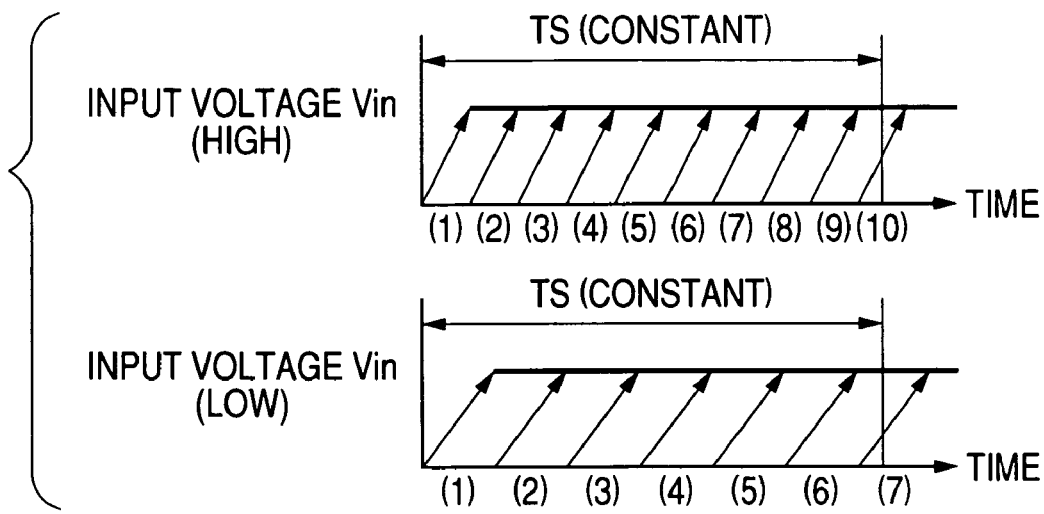
FIG. 4A and FIG. 4B are diagrams showing output from the A/D conversion circuit shown in FIG. 3.
Figure 4B:
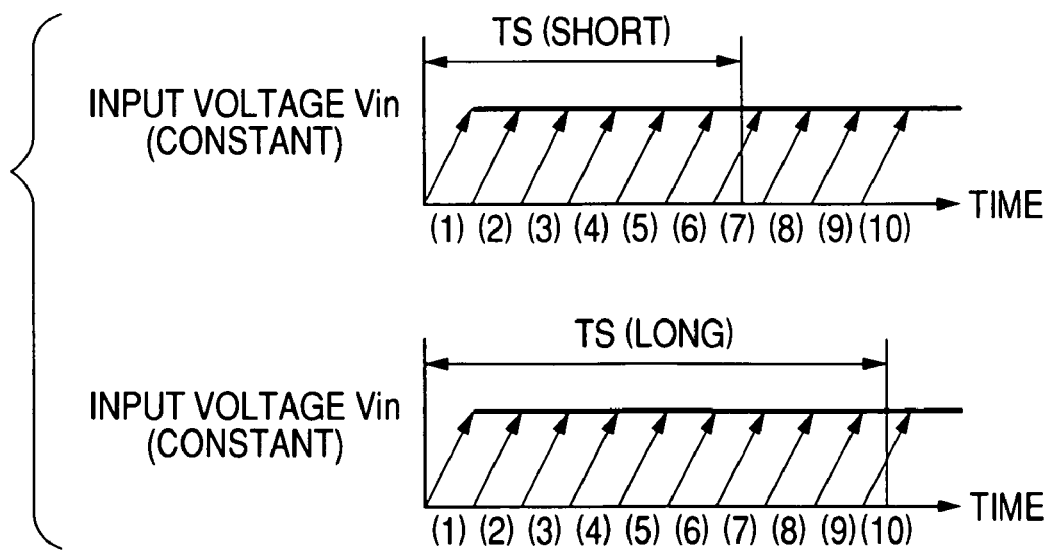

FIG. 4A and FIG. 4B are diagrams showing the change of output from each delay unit DU during the transmission of the input pulse Pin in the pulse delay circuit 10. In particular, FIG. 4A shows a case of different input voltages Vin (High level and Low level), and FIG. 4B shows a case of different sampling time periods (set period) TS.

As shown in FIG. 4A, when the input voltage Vin becomes a high level under a condition of a fixed value of the sampling time period TS, the delay time of the input pulse Pin in each delay unit DU becomes short. That is, the number of the stages of the delay units through which the input pulse Pin passes during the sampling time period TS becomes thereby increased. In the upper case shown in FIG. 4A, the number of the stages becomes ten, namely (1) to (10). On the contrary, when the input voltage Vin becomes a low level under a condition of a fixed value of the sampling time period TS, the delay time of the input pulse Pin in each delay unit DU becomes long. That is, the number of the stages of the delay units through which the input pulse Pin passes during the sampling time period TS becomes thereby decreased. That is, in the bottom case shown in FIG. 4A, the number of the stages is seven, namely (1) to (7).

When the sampling time period TS takes a constant value, the output from the latch and encoder 12 changes according to the voltage level of the input voltage Vin, and the digital data DT becomes numerical data items obtained by performing the A/D conversion of the input voltage Vin.

In addition, as shown in FIG. 4B, when the sampling time period becomes short under a condition of a fixed value of the input voltage Vin, namely, of a constant value of the delay time of each delay unit DU, the number of the stages of the delay units DU through which the input pulse Pin passes during the sampling time period TS becomes thereby decreased. In the upper case shown in FIG. 4B, the number of the stages becomes seven, namely (1) to (7).

On the contrary, when the sampling time period becomes long under a condition of a fixed value of the input voltage Vin, namely, of a constant value of the delay time of each delay unit DU, the number of the stages of the delay units DU through which the input pulse Pin passes during the sampling time period TS becomes thereby increased. In the bottom case shown in FIG. 4B, the number of the stages becomes ten, namely (1) to (10).

That is, when the sampling time period TS becomes long, the input voltage Vin is encoded with more bit numbers. In other words, the latch and encoder 12 can output the digital data DT with a high resolution.

When the sampling time period TS takes a constant value, the output from the latch and encoder 12 changes according to the voltage level of the input voltage Vin, and the digital data DT becomes numerical data items obtained by performing the A/D conversion of the input voltage Vin.

In the image sensor 1 having the configuration described above according to the first embodiment, the array blocks Bi (i=1 to 20) are selected based on the selection signal SEL, and the selected array blocks only operate, and the A/D conversion is performed for the detection signal from each picture element forming the sub array 3 in the selected array block Bi, and the digital data DT as the result of the A/D conversion is output in sequential order through the output pad Po corresponding to the selected array block.

It is possible to set the resolution of the A/D conversion data (as the digital data DT) by adjusting the set timing period TS.

Next, a description will now be given of the zoom-in data collection operation for a specified area in the image sensor 1 having the above configuration of the first embodiment referring to FIG. 5, in particular, the image sensor 1 is controlled by the sensor controller 30. Through the specification, the word "zoom-in" means "zoom-up".

Figure 5:
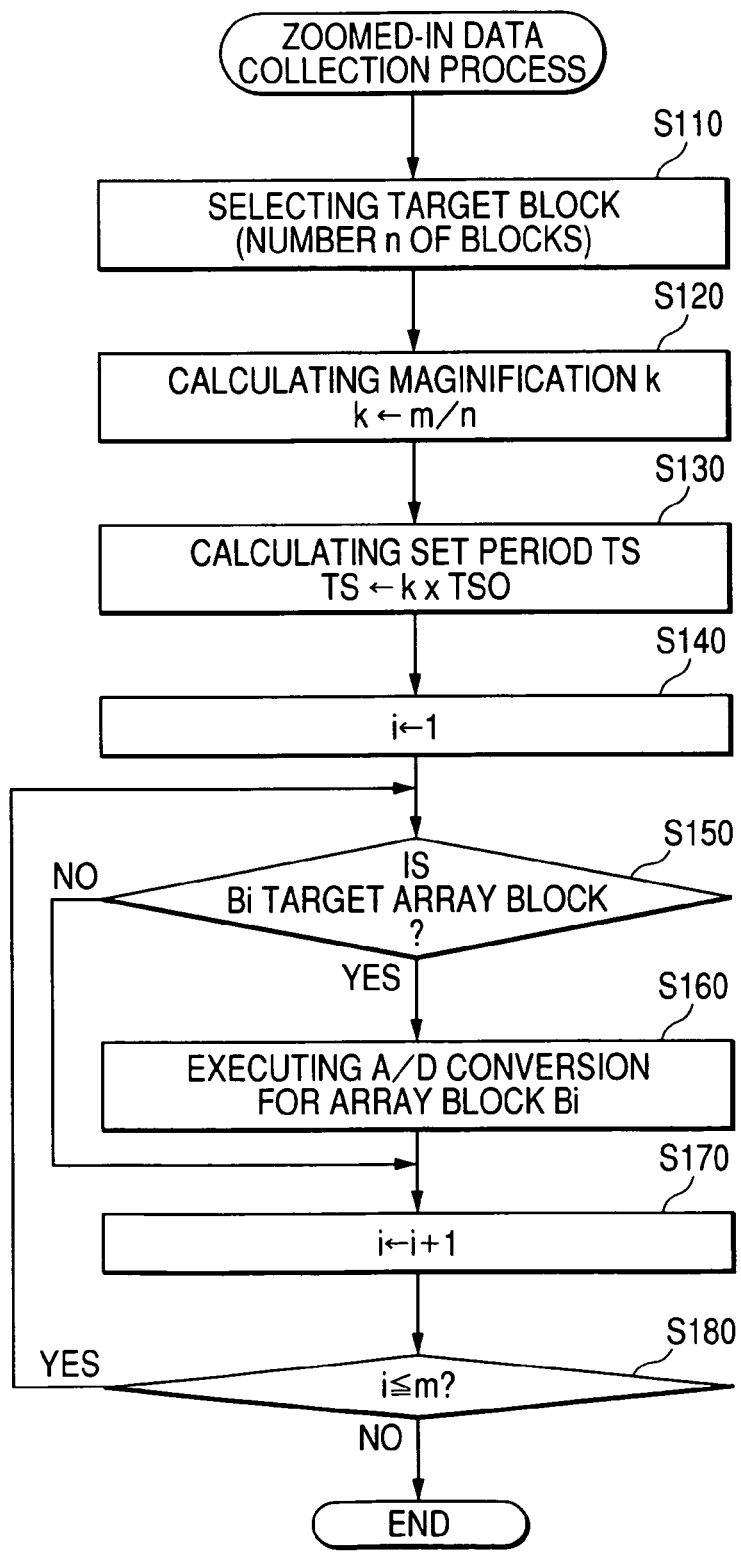
FIG. 5 is a flow chart showing process of a zoom-in data collection by the image sensor of the first embodiment shown in FIG. 1.

FIG. 5 is a flow chart showing zoom-in data collection operation performed by the image sensor 1 according to the first embodiment shown in FIG. 1.

First, target array blocks Bi to be processed and the number "n" of the target array blocks Bi are specified based on a zoom-in instruction signal supplied from an external device of the array block Bi such as the sensor controller 30 (step S110).

Based on the total number "m" of the array blocks and the number "n" of the target array blocks specified in step S110, the magnification "k" (=m/n) is calculated (step S120). In addition, the set time period TS (=k×TS0) is calculated by multiplying the magnification "k" by the basic sampling period TS0 (step S130).

The basic sampling time period TS0 is a processing time period per picture element under a condition that the A/D conversion is performed for all of the array blocks Bi (i to m) when the allowable time for one image plane is determined in advance.

That is, the basic sampling time period TS0 is given by T1/S (TS0=T1/S), where T1 is an allowable time for processing one picture image, and S is the total number (S=m×p) of the picture element cells in the image sensor 1.

Next, the variable "i" is initialized to one (i=1) (step S140). It is then judged whether or not the array block Bi is a target to be processed (step S150). If a judgment result indicates that the array block Bi is the target, selection signal SEL and the set time period signal TS calculated in step S130 are supplied to the array block Bi. On supplying those signals SEL and TS, the A/D conversion for the array block Bi is initiated (step S160).

At this time, the A/D conversion data (as digital data DT) obtained through the output pad Po are stored in a memory (not shown) or supplied to a digital signal processor DSP (omitted from diagrams) in a following stage.

After the completion of the operation in step S160 or when the judgment result indicates that the array block Bi is not the target to be processed, the variable "i" is incremented by 1 (step S170) and it is judged whether or not the incremented variable "i" is not more than the total number "m" of the array blocks Bi (step S180).

If the variable "i" is not more than "m" (i≦m), the operation flow returns to step S150, and the steps from S150 to S170 are repeated. If the variable "i" is more than "m" (i>m), the A.D conversion is completed.

Figure 6:
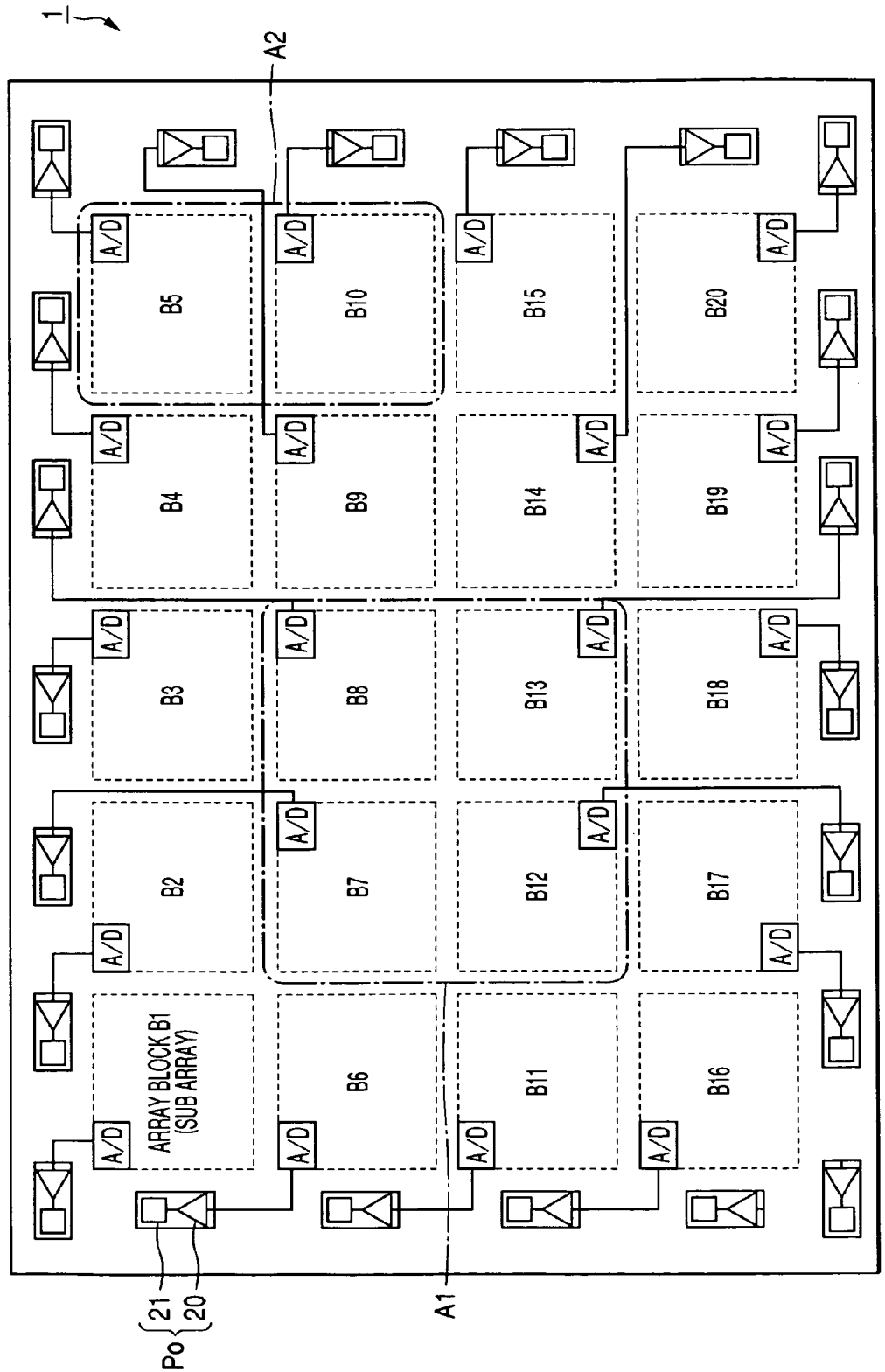
FIG. 6 is the block diagram showing the configuration of the image sensor, in particular, showing array blocks selected in the plural array blocks and peripheral units for use in the operation of the zoom-in data collection in the image sensor according to the first embodiment.

FIG. 6 is the block diagram showing the configuration of the image sensor, in particular, shows array blocks selected in the plural array blocks and peripheral units for use in the operation of the zoom-in data collection in the image sensor according to the first embodiment.

For example, as shown in FIG. 6, when the total number "m" of the array blocks Bi is 20 (m=20) and the four array blocks B7, B8, B12, and B13 in an area A1 are the targets to be processed, the number "n" of the array blocks is four (n=4), and the magnification "k" is 5 (k=m/n=20/4=5). That is, the A/D conversion in the image sensor 1 of the first embodiment uses only four array blocks necessary for the zoom-in process, not use all of the array blocks B1 to B20, and the A/D conversion operation is performed with the sampling period (set period) TS that is five timed of the basic sampling period TS0. In other word, A/D conversion data (digital data DT) transferred from only the array blocks necessary for the zoom-in process are collected. The collected digital data have a high resolution when compared with a usual case.

The image sensor 1 of the first embodiment supplies the digital data DT and its resolution information such as the magnification "k" to the devices such as a DSP in the following stage. When receiving those data and information, the devices in the following stage can process the digital data DT based on the information regarding its resolution.

As described above in detail, the A/D converter 7 is formed per array block Bi in the image sensor 1 of the first embodiment, that is, the A/D converter 7 is provided per sub array 3 in which the plural picture elements 2 are arranged in two-dimensional (2D) arrangement.

According to the image sensor of the first embodiment, the A/D conversion in the operation of the zoom-in function can be performed only for the detection data (or light signal) obtained from the sub arrays 3 (array block Bi) involved in the target area of the zoom-in function. Because it is possible to eliminate the processing of the detection data from the sub arrays 3 other than the area including the target sub arrays for the zoom-in process, the zoom-in operation can be performed efficiently with a high speed.

Further, according to the image sensor 1 of the first embodiment, it is possible to easily realize high-performance processing by selecting plural areas for the zoom-in process and giving different magnitude of the zoom-in to the different areas.

Furthermore, according to the image sensor 1 of the first embodiment, because the A/D converter 7 is placed adjacent to the corresponding sub array 3 in the array block Bi, it is possible to have a minimum length of the transmission line through which the detection signal (analogue signal) is transferred from each picture element 2 to the A/D converter 7. Having the minimum length can suppress superimpose of noises in the transmission lines. It is therefore possible to provide A/D conversion data with a high accuracy and to obtain two dimensional image signal with a high accuracy.

Still further, according to the image sensor 1 of the first embodiment, a pulse delay type A/D conversion circuit is used for the A/D converter 7. Because the entire of the pulse delay type A/D conversion circuit is made of digital circuits, it is possible to reduce the size of the A/D converter, and also possible to reduce the size of the IC chip on which the image sensor 1 of the first embodiment is formed.

In addition, because the pulse delay type A/D conversion circuit uses, as one of the A/D conversion information, the number of the stages through which the pulse signal passes during the sampling period, it is possible to change the degree of the resolution of the A/D conversion data (digital data DT) to an optional value by increasing the time length of the sampling period.

Still furthermore, in the image sensor 1 of the first embodiment, when the A/D conversion data necessary for the zoom-in process are collected, the A/D conversion process is performed only using n-array blocks selected as the array blocks involved in the target area for the zoom-in process, and the sampling period (set period) TS is set to k times (k=m/n) of the basic sampling period TS0. Accordingly, the processing time for the remaining array blocks Bi that are not involved in the target area for the zoom-in process can be used as the time for the A/D conversion process of the picture element cells 2 involved in the target area. That is, the length of the time for the A/D conversion process of the picture element cells 2 involved in the target area can be thereby increased.

Accordingly, without changing the length of the time for processing the entire of the image plane in the entire of the image sensor 1, or without performing mechanical handling (for example, a moving or adjusting a position of a lens) to an expensive optical system, high precisely A/D conversion data can be obtained and the zoom-in process of a high resolution can be performed.

Moreover, according to the first embodiment, the control signal C1 to Cp are generated in synchronization with the sampling clock signal CKS, and the period of the control signal C1 to Cp are set to integral-multiple of the period of the sampling clock CKS. It is thereby possible to eliminate a high frequency noise caused by the control clock signal during the operation of the A/D converter 7 made of the pulse delay type A/D conversion circuit. Further, it is also possible to eliminate efficiently noise components caused by the control signals C1 to Cp. Thus, the image sensor 1 of the first embodiment can eliminate noise components that are in synchronization with the sampling clock signal CKS and can obtain the A/D conversion data of a wide dynamic range with a high precisely.

Although the A/D conversion data are obtained by operating each of the array blocks in order in the first embodiment, the present invention is not limited by this embodiment. For example, it is acceptable to execute the A/D conversion process by the plural array blocks in parallel in order to obtain the entire of the image plane at a high speed.

Although the set period TS is changed according to the number "n" of the array blocks specified as the target for the zoom-in operation in the first embodiment, it is possible to set the set period TS to a fixed value such as the basic sampling time period TS0, or acceptable to set the set period TS to an optional value only on receiving a change permission instruction transferred from an external device.

Second Embodiment

Next, a description will now be given of the image sensor according to the second embodiment of the present invention. The difference between the first embodiment and the second embodiment is the data collection in the zoom-in process (or zoom-up process).

Figure 7:
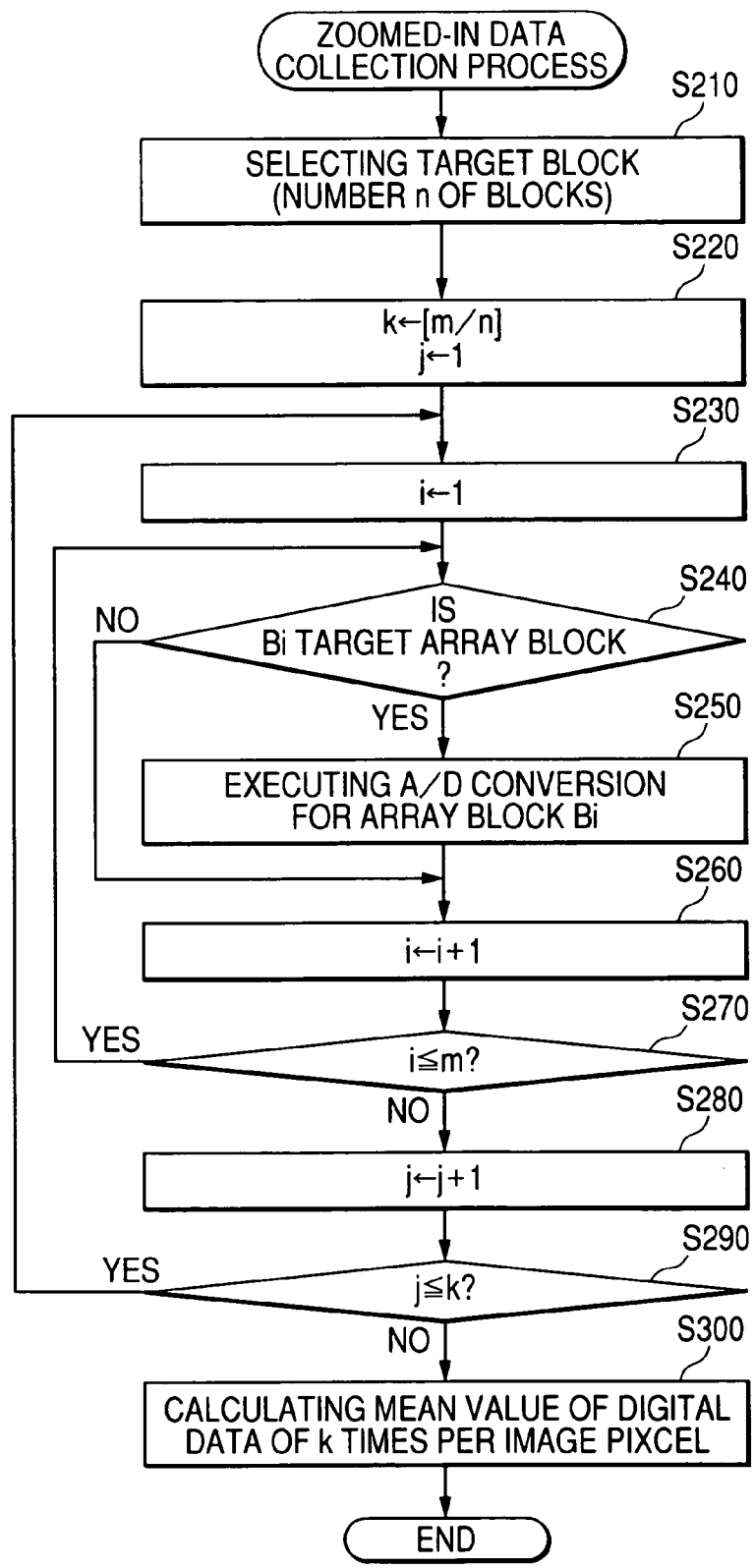
FIG. 7 is a flow chart showing the process of the zoom-in data collection in the image sensor according to a second embodiment of the present invention.

FIG. 7 is a flow chart showing the process of the zoom-in data collection in the image sensor according to the second embodiment of the present invention.

First, target array blocks Bi to be processed and the number "n" of the target array blocks Bi are specified based on a zoom-in instruction signal supplied from an external device of the array block Bi such as the sensor controller 30 (step S210).

Based on the total number "m" of the array blocks Bi and the number "n" of the target array blocks specified in step S210, an iteration number "k" (=[m/n]) is calculated and a variable "j" is initialized to 1 (step S220), where [x] means an integer part of the value "x".

Following, the variable "i" for identifying array block Bi is initialized to one "1" (step S230). It is then judged whether or not the array block Bi is a target to be processed that is specified in step S210 (step S240).

If the array block Bi is the target, the selection signal SEL and the set time period signal TS (that is the same of the basic sampling period TS0 in this second embodiment) are supplied to the array block Bi. On supplying those signals SEL and TS, the A/D conversion for the array block Bi is executed (step S250).

At this time, the A/D conversion data (as digital data DT) obtained through the output pad Po are stored in a memory (not shown).

After the completion of the process in step S250 or when the judgment result of step S240 indicates that the array block Bi is not the target to be processed, the variable "i" is incremented by 1 (step S260) and it is judged whether or not the incremented variable "i" is not more than the total number "m" of the array blocks Bi (step S270).

If the variable "i" is not more than "m" (i≦m), the operation flow returns to step S240, and the steps from S240 to S260 are repeated. If the variable "i" is more than "m" (i>m), the variable "j" is incremented by 1 (step S280).

Following, it is judged whether or not the variable "j" is not more than the iteration number "k" set in step S220 (step S290).

If the variable "j" is not more than the value "k" (j≦k), the operation flow returns to step S230, and the steps from S230 to S280 are repeated. On the contrary, if the variable "j" is more than the value "k" (j>k), a mean value or an average value of the A/D conversion data (digital data DT) of k-iteration is calculated, and output as the A/D conversion data to external devices in the following stage. The zoom-in data collection process is then complicated.

For example, as shown in FIG. 6, when the array blocks B5, B7, B8, B10, B12, and B13 involved in the areas A1 and A2 are targets to be processed, the number "n" of the array block is six (n=6) and the number "k" of the iteration is 3 (k=[20/6]=3). Therefore the A/D conversion is performed three times only for the array blocks B7, B8, B12, and B13 during the processing time for one image plane, and the mean value or average value of the A/D conversion data obtained during the three iteration processes are used for the following stage. That is, according to the zoom-in data collection process in the second embodiment, the A/D conversion data (digital data DT) obtained only from the target area of the zoom-in process become or have a high accuracy when compared with the A/D conversion data obtained in the usual processing.

As described above, according to the second embodiment, when the A/D conversion data for use in the zoom-in process is obtained from the image sensor 1, only the "n" array blocks Bi is executed, which are selected as the target array blocks for the A/D conversion involved in the target area of the zoom-in process. Further, the A/D conversion is executed "k" times (k=[m/n]) for each picture element cell 2 involved in the array blocks Bi selected as the target of the zoom-in process and the average value of the A/D conversion data of "k" times is calculated. The external device (not shown) in the following stage executes the average value of the A/D conversion data of k times transferred from the image sensor 1 of the second embodiment as the zoom-in data.

That is, when compared with the conventional image sensor, the image sensor of the second embodiment can increase the execution time for the A/D conversion of each picture element cell 2 involved in the target array blocks for the zoom-in process by the execution time length necessary for non-target array blocks.

Accordingly, like the effect and operation of the image sensor of the first embodiment, it is possible to generate A/D conversion data of a high resolution or a high gradation and to realize and perform the zoom-in process with a high resolution without changing the processing time for one image plane of the image sensor, and without necessary any mechanical handling of a high price optical system (for example, adjusting the position of a lens in the optical system).

Although the second embodiment calculates the average value of digital data of k times, the present invention is not limited by this manner.

For example, it is possible to calculate the sum of the A/D conversion data of k times instead of the average value.

Third Embodiment

Next, a description will now be given of the image sensor of the third embodiment according to the present invention with reference to FIG. 8.

Figure 8:
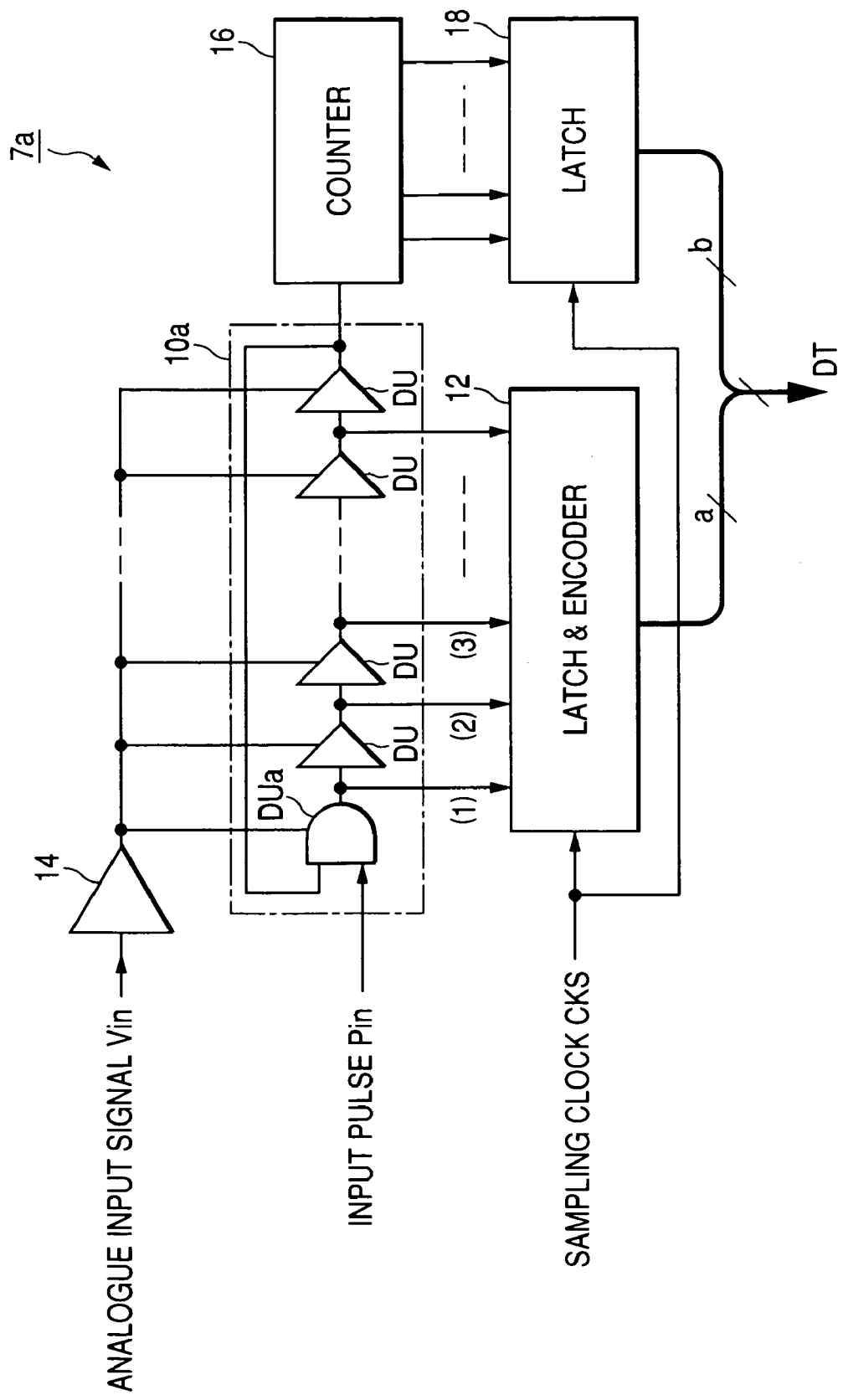
FIG. 8 is a block diagram showing a configuration of an A/D conversion circuit (also showing a part of a circuit diagram) in an array block in an image sensor according to a third embodiment of the present invention.

FIG. 8 is a block diagram showing a configuration of an A/D conversion circuit (also showing a part of a circuit diagram) in an array block in the image sensor according to the third embodiment. The difference between the third embodiment and the first embodiment is the configuration of the A/D conversion circuit. Other components of the third embodiment are the same of those of the first embodiment.

As shown in FIG. 8, a delay unit DU of an initial stage forming a pulse delay circuit 10a that forms an A/D conversion circuit 7a in the image sensor of the third embodiment is made of an AND gate DUa. The input pulse Pin as an initiation signal is input to one input terminal of the AND gate DUa. Another input terminal of the AND gate DUa is connected to the output terminal of the delay unit DU of the final stage. Thus, all of the delay units DUa and DU forming the pulse delay circuit 10a are connected in ring shape so as to circulate the input pulse Pin through the delay units DUa and DU. That is, the pulse delay unit 10a is formed as a ring delay line (RDL).

The A/D conversion circuit 7a further has a counter 16 and a latch circuit 18. The counter 16 counts the circulation number of the input pulse Pin in the pulse delay circuit 10a. The latch circuit 18 latches the count value from the counter 16 at a rising edge of the sampling clock signal CKS.

The A/D conversion circuit 7 having such a configuration described above outputs the digital data DT that is made up of lower bit data items "a" and upper bit data items "b". The lower bit data items "a" represent the digital data voltage level of the input voltage Vin output from the latch and encoder 12. The upper bit data items "b" represent the count value output from the counter 16. Those upper bit data items and the lower bit data items also represent the voltage level of the input voltage Vin.

By the way, the A/D conversion circuit 7 of the first embodiment shown in FIG. 3 requires the delay units DU of several ten to several hundred numbers in order to form the pulse delay circuit 10. On the contrary, the A/D conversion circuit 7a of the third embodiment shown in FIG. 8 requires only the delay units DUa and DU of eight to sixteen numbers in order to form the pulse delay circuit 10a. This can reduce the number of the delay units greatly and also reduce the size of the image sensor 1, and also achieves miniaturization of the IC chip on which the image sensor is mounted.

Fourth Embodiment

Next, a description will now be given of the image sensor of the fourth embodiment according to the present invention with reference to FIG. 9.

Figure 9:
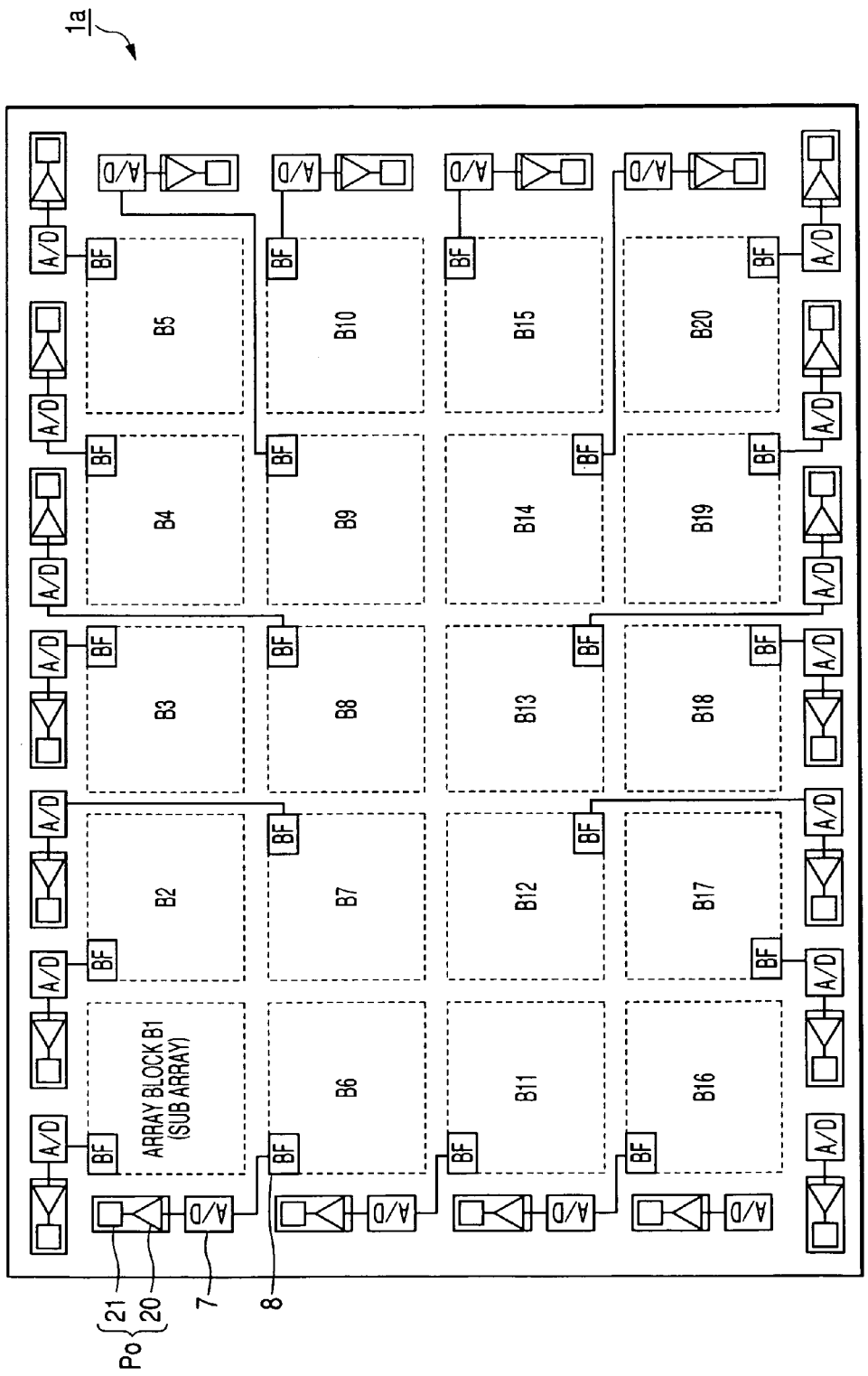
FIG. 9 is a block diagram showing a configuration of an image sensor, in particular, showing an arrangement of plural array blocks and peripheral units in the image sensor according to a fourth embodiment of the present invention.
Figure 10A:
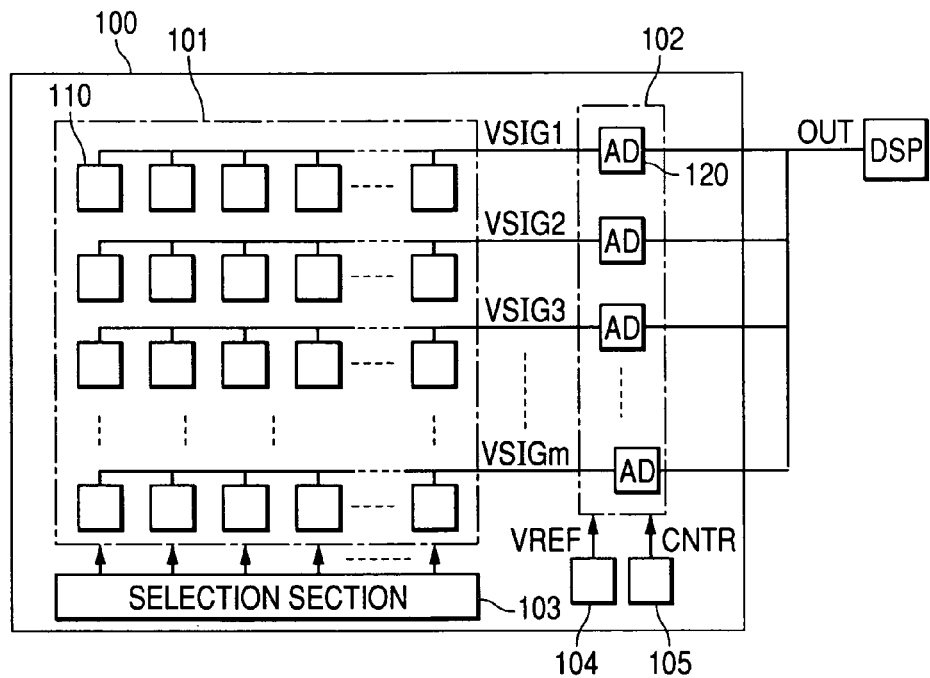
FIG. 10A is a block diagram showing a configuration of each sub array forming a conventional image sensor.
Figure 10B:
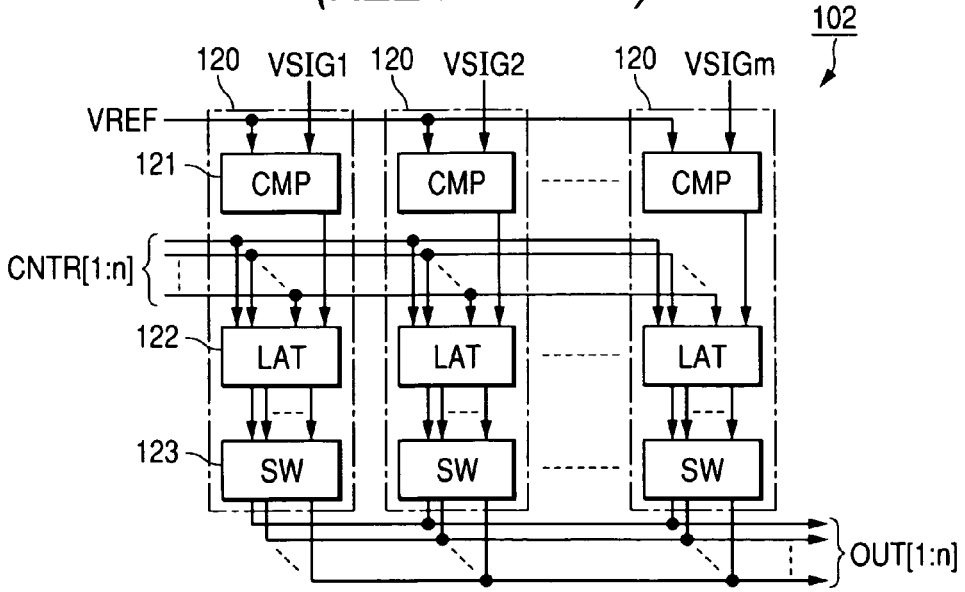
FIG. 10B is a block diagram showing a configuration of an A/D conversion circuit in the conventional image sensor shown in FIG. 10A.

FIG. 9 is a block diagram showing a configuration of an image sensor, in particular, shows an arrangement of plural array blocks and peripheral units in the image sensor according to the fourth embodiment. As shown in FIG. 9, each array block Bi of the image sensor 1a of the fourth embodiment has a buffer circuit 8 instead of the A/D converter 7. The A/D converter 7 is placed between the adjacent output pads Po arranged at the peripheral section of the IC chip.

The buffer circuit 8 is a small-sized circuit because it is made of a small number of transistors when compared with that of the A/C converter 7.

This configuration of the fourth embodiment can reduce dead area that is not receive light in the entire of the sub arrays 3 forming the light receiving element array. The A/D converter 7 in the fourth embodiment uses the dead area that is not used in the conventional image sensor and the image sensor according to the first to third embodiment. Therefore the image sensor of the fourth embodiment can reduce the area of the IC chip because of the placement of the A/D converter 7 in the dead area. It is also possible to place the A/D converter 7 at an area adjacent to the output pad Po (namely, the bottom area of the output pad Po) instead of the dead area between the adjacent output pads Po.

Other Embodiments

The scope of the present invention is not limited by the above embodiments, and it is acceptable to have following embodiments within the scope of the present invention. For example, the first to fourth embodiments of the present invention show the MOS type image sensor in which the sub array 3 as the light receiving element array in each array block Bi has a pair of the photoelectric conversion element (photo diode) 2a and the contactless switch 2b, and the photoelectric conversion element 2a outputs the analogue data by ON/OFF switching of the contactless switch 2b.

It is possible to apply the concept of the present invention to a CCD type image sensor in which electric charges obtained from photo diodes are transferred to analogue registers by entering to ON corresponding switches for the photo diodes simultaneously, and the electric charges stored in the analogue registers are output sequentially by shifting those electric charges in the analogue register based on clock pulses (carrier wave).

Further, although the above embodiments of the present invention show the configuration in which the light receiving element array is divided into the plural sub arrays 3 of same shape and size, the present invention is not limited by this configuration. It is acceptable to change the number of the picture element cells 2 forming each sub array 3 and the arrangement of those picture element cells 2 according to purposes and conditions of applications to which the image sensor of the present invention is applied.

Features and Effects of the Present Invention

A first aspect of the present invention relates to the configuration of the image sensor and has following features and effects. The image sensor mounted on a single IC chip has a light receiving element array and an A/D conversion section. In the light receiving element array, a plurality of picture element cells are arranged in a two-dimension arrangement and divided into a plurality of sub arrays. Each picture element cell has at least a photoelectric conversion element. The A/D conversion section is configured to perform A/D conversion of received light signals (or detection signals) transferred from the light receiving element array. The A/D conversion section has a plurality of A/D converters. Each of the A/D converters is placed corresponding to each sub array.

In the image sensor having the above configuration, it is possible to select plural areas in the light receiving element array, that are target areas for the zoom-in operation, and to apply different zoom-in rate to those plural areas. Thus, the present invention has a high performance and can execute complicated operation easily with a simple configuration.

The A/D converters, each is provided to each sub array, and which form the A/D conversion section, can be placed at the position adjacent to the corresponding sub array, or can be placed at the peripheral section of the light receiving element array.

In the former case, that is, the A/D converter is placed adjacent to the corresponding sub array, because a transmission line of a minimum length for the transmission of analogue data (detection data) can be formed between the light receiving element and the A/D converter, it is possible to suppress overlapping noises generated on the transmission line, and thereby possible to obtain A/D conversion data with a high precisely and also two dimensional image signals. But, because the A/D converter placed adjacent to the corresponding sub array is larger in circuit size than each picture element cell, a dead area is formed in the light receiving element array. On the contrary, the latter case in which the A/D converters is placed at the peripheral section of the light receiving element array requires a buffer circuit placed adjacent to the corresponding sub array. Because the buffer circuit is smaller in circuit size than the A/D converter, it is possible to reduce the dead area in the in the light receiving element array.

Further, in the latter case, when a pad through which the detection signal is output from the A/D converter is placed at the peripheral section of the light receiving element array, it is preferred to place the A/D converter between adjacent pads or at the bottom end of the pad. That is, the bottom end of the pad is a free space, and using the free space can reduce the entire size of the IC chip.

It is further preferred to use as the A/D converter a pulse delay type A/D conversion circuit made of a pulse delay circuit and a coding circuit. The pulse delay circuit has a plurality of delay units connected in series as plural stages configured to delay a pulse signal by a delay time corresponding to the level of the received light signal transferred from the corresponding sub array. The coding circuit is configured to detect the number of the stages of the delay units through which the pulse signal passes during a measurement time period that is a period of a sampling clock signal (CKS) set in advance, and to generates and output A/D conversion data as numerical data corresponding to the number of the stages detected.

The entire circuits forming the pulse delay type A/D conversion circuit are made of digital circuits and has a very small size and can operate at a high speed when compared with a successive approximation type A/D converter, a parallel type A/D converter, and a double integration type A/D converter that are different in configuration from a usual A/D converter. It is thus possible to form the image sensor of a small size and having a high speed performance.

Because the pulse delay type A/D conversion circuit outputs as the A/D conversion data the number of the stages of the delay units through which a pulse signal passes for a sampling time period, it is possible to change optionally the resolution of the A/D conversion and the gradation of the detection data output form the picture element.

In other words, the present invention can realize the zoom-in function of a high resolution without handling (such as shifting or adjusting the position of a lens mechanically) an optical system of a high price.

A second aspect of the present invention relates to the configuration of the image sensor and has following features and effects. The image sensor mounted on a single IC chip has a light receiving element array and an A/D conversion section. In the light receiving element array, a plurality of picture element cells are arranged in a two-dimension arrangement, and each picture element cell has at least a photoelectric conversion element. The A/D conversion section is configured to perform A/D conversion of received light signals transferred from the light receiving element array. The A/D conversion section has a plurality of A/D converters. Each A/D converter has a pulse delay circuit and a coding circuit. The pulse delay circuit has a plurality of delay units connected in series as plural stages configured to delay a pulse signal by a delay time corresponding to the level of the received light signal transferred from the corresponding sub array. The coding circuit is configured to detect the number of the stages of the delay units through which the pulse signal passes during a measuring time period that is a period of a sampling clock signal (CKS) set in advance, and to output A/D conversion data as numerical data corresponding to the number of the stages detected.

That is, using the pulse delay type A/D converter as the A/D converter the image sensor mounted on the IC chip can reduce the size of the entire of the IC chip adequately even if the A/D converter is provided for each sub array in the present invention, or provided for each line in the prior art. Further, the above configuration of the present invention can obtain the effect to change the resolution of the A/D conversion optionally.

Moreover, when the pulse delay circuit forming the A/D converter is made of a ring shape delay circuits in which delay units connected in series are connected in a ring shape, it is acceptable to form the coding circuit to generate the A/D conversion data based on a combination of the circulation number and the position information of the pulse signal. The circulation number indicates the number of the circulation of the pulse signal through the ring shaped delay units for the measurement time period. The position information of the pulse signal indicates the position of the pulse signal in the ring shaped delay circuit at the completion time of the measurement time period. In this configuration, because the number of the stages of the pulse delay circuit can be reduced, it is possible to reduce the size of the entire circuit area, and thereby to reduce the size of the IC chip.

By the way, in the image sensors having the above configurations, when the pulse delay type A/D conversion circuit is used as the A/D converter, it is preferred to synchronize the sampling clock signal CKS with the control clock signal CKC by which the control signals C1, C2, ..., and Cp are generated so as to output the detection signals from the picture element cells forming the light receiving element array.

In particular, the sampling clock signal is generated by dividing the control clock signal CKS by 1/d (d is a positive integer). That is, it is preferred that the period of the sampling clock signal is integral multiple of the control clock signal CKC. It is possible to obtain A/D conversion data with a high preciously because the pulse delay type A/D conversion circuit can eliminate a noise component of a frequency that is integral multiple of the sampling clock signal CKS (see Japanese patent laid open publication number JP 2003-65768 disclosing detailed information).

It is acceptable that the light receiving element array is made of a CMOS image sensor or made of a CMOS image sensor.

Next, a third aspect of the present invention relates to the image sensor control method and has following features and effects. In the image sensor having a light receiving element array and an A/D conversion section, the light receiving element array has "m" sub arrays, where m=n×k, m>n, and m, n, and k are positive integers. Each sub array is composed of picture element cells of a same number. Each picture element cell has a photoelectric conversion element. The A/D conversion section has a plurality of A/D converters. Each A/D converter is provided for each sub array.

The image sensor control method performs an A/D conversion using the selected sub arrays for a measurement time period given in advance. In the method, on the A/D conversion using only the sub arrays selected, the A/D conversion is executed k-times for each of the picture element cells forming the sub arrays selected. One of a summation value of and an average value of A/D conversion data items obtained from the k-times execution of the A/D conversions is used as the A/D conversion data to be output.

That is, according to the image sensor control method, the A/D conversion is performed only for the selected sub arrays, and the remaining processing time other than the processing time of the selected sub arrays in the time length necessary for processing the entire image plane is used for performing the A/D conversion for the selected sub arrays repeatedly. Further, a summation value or an average value of the A/D conversion data for the selected sub array is calculated and output from the image sensor to devices of a following processing stage. Thus, according to the image sensor control method of the present invention, it is possible to obtain the A/D conversion data with a high resolution (high graduation) without changing the total processing time length that is necessary for performing the A/D conversion process for one image plane.

Next, a fourth aspect of the present invention relates also to the image sensor control method and has following features and effects. In the image sensor having a light receiving element array and an A/D conversion section, the light receiving element array has "m" sub arrays, where m is a positive integer. Each sub array is composed of picture element cells of a same number. Each picture element cell has a photoelectric conversion element. The A/D conversion section has a plurality of A/D converters. Each A/D converter is provided for each sub array. The image sensor control method has a step of performing an A/D conversion using only the sub arrays selected for a measurement time period by which a resolution of A/D conversion data output from the A/D conversion section is changed. In the image sensor control method, the A/D conversion for the selected sub arrays is executed for the measurement time period of m/n multiple times so as to output the A/D conversion data.

That is, because the A/D converter can output the A/D conversion data of a high resolution according to increasing the measurement time length. For example, on performing the zoom-in process for the sub arrays selected, it is possible to increase the measuring time length for the picture element cells in the sub arrays selected by the processing time for the remaining sub arrays that are not selected. Thus, according to the image sensor control method of the present invention, it is possible to obtain the A/D conversion data with a high resolution (high graduation) without changing the total processing time length that is necessary for performing the A/D conversion process for one image plane.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. An image sensor mounted on a single IC chip comprising:
   a light receiving element array in which a plurality of picture element cells are arranged in a two-dimension arrangement and divided into a plurality of sub arrays, and each picture element cell has at least a photoelectric conversion element;
   an analog to digital (A/D) conversion section configured to perform A/D conversion of light signals received from the light receiving element array, the A/D conversion section comprising a plurality of A/D converters, each of the A/D converters disposed in each of the sub arrays and handling a plurality of columns of the picture element cells in each of the sub arrays, and each of the A/D converters comprising:
      a pulse delay circuit comprising a plurality of delay units connected in series as plural stages configured to delay a pulse signal by a delay time corresponding to the level of the light signal received from the corresponding sub array; and
      a coding circuit configured to detect the number of the stages of the delay units through which the pulse signal passes during a measuring time period that is a period of a sampling clock signal (CKS) set in advance, and to output A/D conversion data as numerical data corresponding to the number of the stages detected; and
   a sub array controller for generating control signals for selecting one of the picture element cells, wherein
      the plurality of sub arrays are in a two-dimension arrangement.

2. The image sensor according to claim 1, wherein
   the pulse delay circuit comprises a ring-shaped time delay circuit in which the delay circuits are connected in series and in a ring connection, and
   the coding circuit generates the A/D conversion data based on the number of circulations of the pulse signal through the ring-shaped time delay circuit during the measurement time period, and the position information of the pulse signal in the ring-shaped time delay circuit detected at the time of the completion of the measurement time period.

3. The image sensor according to claim 1, wherein the sampling clock signal (CKS) is in synchronization with a control clock signal (CKC) for generating control signals to be supplied to the light receiving element array in order to output the light signals received from the picture element cells in the light receiving element array.

4. The image sensor according to claim 3, wherein the control clock signal (CKC) is divided by 1/d (d in a positive integer) and the clock signals divided are used as the sampling clock signals (CKS).

5. The image sensor according to claim 1, wherein the light receiving element array is formed as one of a CMOS image sensor and a CCD image sensor.

6. The image sensor according to claim 1, wherein
   the analog to digital conversion section is placed in the inside area of the light receiving element array.

7. The image sensor according to claim 1, wherein
   each of the A/D converters is placed in the inside area of each of the sub arrays in which a plurality of the picture element cells is arranged.

8. The image sensor according to claim 1, wherein
   each of the A/D converters is placed at a corner in the inside area of each of the sub arrays in which a plurality of the picture element cells is arranged.

9. An image sensor mounted on a single IC chip comprising:
   a light receiving element array in which a plurality of picture element cells are arranged in a two-dimension arrangement and divided into a plurality of sub arrays, and each picture element cell has at least a photoelectric conversion element;
   an analog to digital (A/D) conversion section configured to perform A/D conversion of light signals received from the light receiving element array, the A/D conversion section placed in the inside area of the light receiving element array, and comprising a plurality of A/D converters, and each of the A/D converters comprising:
      a pulse delay circuit comprising a plurality of delay units connected in series as plural stages configured to delay a pulse signal by a delay time corresponding to the level of the light signal received from the corresponding sub array; and
      a coding circuit configured to detect the number of the stages of the delay units through which the pulse signal passes during a measuring time period that is a period of a sampling clock signal (CKS) set in advance, and to output A/D conversion data as numerical data corresponding to the number of the stages detected; and
   a sub array controller for generating control signals for selecting one of the picture element cells, wherein
      the plurality of sub arrays are in a two dimension arrangement, and
      each of the A/D converters is placed in the inside area of each of the sub arrays in which a plurality of the picture element cells is arranged.

10. The image sensor according to claim 9, wherein
   each of the A/D converters is placed at a corner in the inside area of each of the sub arrays in which a plurality of the picture element cells is arranged.

* * * * *